United States Patent
Nguyen et al.

(10) Patent No.: US 11,061,588 B2
(45) Date of Patent: Jul. 13, 2021

(54) USING GENERIC VOLUME ENTRIES TO ADD SPECIFIC VOLUMES MANAGED BY A STORAGE MANAGEMENT SUBSYSTEM (SMS) TO A VOLUME LIST DEFINITION

(71) Applicant: International Business Machines Corporation, Armonk, NY (US)

(72) Inventors: Tan Q. Nguyen, San Jose, CA (US); Gerard Maclean Dearing, San Jose, CA (US); Andrew Trinh, Tucson, AZ (US); Romell Williams, San Jose, CA (US); Wilson Yang, San Jose, CA (US); Jwu-Shyan Tarng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 16/667,729

(22) Filed: Oct. 29, 2019

(65) Prior Publication Data

US 2021/0124507 A1 Apr. 29, 2021

(51) Int. Cl.
*G06F 3/06* (2006.01)

(52) U.S. Cl.
CPC .......... *G06F 3/0631* (2013.01); *G06F 3/0604* (2013.01); *G06F 3/067* (2013.01); *G06F 3/0614* (2013.01); *G06F 3/0659* (2013.01)

(58) Field of Classification Search
CPC .... G06F 3/0631; G06F 3/0604; G06F 3/0614; G06F 3/0659; G06F 3/067
See application file for complete search history.

(56) References Cited

U.S. PATENT DOCUMENTS 6,434,681 B1 8/2002 Armangau
6,453,383 B1 9/2002 Stoddard et al.
(Continued)

FOREIGN PATENT DOCUMENTS

EP 2637091 A1 9/2013

OTHER PUBLICATIONS

"VATLSTxx (volume attribute list)". IBM Knowledge Center. z/OS Version 2.1.0. <https://www.ibm.com/support/knowledgecenter/en/SSLTBW_2.1.0/com.ibm.zos.v2r1.ieae200/vatlst.htm>. (Year: 2017).*

(Continued)

*Primary Examiner* — Charles Rones
*Assistant Examiner* — Hewy H Li
(74) *Attorney, Agent, or Firm* — Zilka-Kotab, P.C.

(57) ABSTRACT

A computer-implemented method according to one embodiment includes receiving a request to add a generic volume entry to a generic volume element list, storing the generic volume entry in the generic volume element list in a SMS configuration in a SCDS, and building a volume list definition of the SMS configuration. A unit control block chain is parsed for determining additional specific volumes. It is determined whether a specific volume found in the parsing was not used in the building. In response to a determination that the specific volume found in the parsing was not used in the building, it is determined, for the specific volume found in the parsing, whether at least one predetermined condition is met. The specific volume found in the parsing is added to the volume list definition in response to a determination that the at least one predetermined condition is met.

20 Claims, 7 Drawing Sheets

(56) References Cited

U.S. PATENT DOCUMENTS

| | | | |
|---|---|---|---|
| 6,529,995 | B1 | 3/2003 | Shepherd |
| 9,110,919 | B2 | 8/2015 | Mamidi et al. |
| 10,033,813 | B2 | 7/2018 | Kripalani et al. |
| 2007/0106841 | A1* | 5/2007 | Stewart ............... G06F 3/0632 711/112 |
| 2011/0106862 | A1 | 5/2011 | Mamidi et al. |
| 2013/0019071 | A1* | 1/2013 | Lewis ................ G06F 3/0644 711/154 |
| 2017/0118285 | A1 | 4/2017 | Kripalani et al. |

OTHER PUBLICATIONS

"Source control data set (SCDS)". IBM Knowledge Center. z/OS Version 2.1.0. <https://www.ibm.com/support/knowledgecenter/en/SSLTBW_2.1.0/com.ibm.zos.v2r1.gim3000/smpscds.htm>. (Year: 2014).*

"Specifying a generic volume serial number". IBM Knowledge Center. z/OS Version 2.1.0. <https://www.ibm.com/support/knowledgecenter/en/SSLTBW_2.1.0/com.ibm.zos.v2r1.ieae200/gen1.htm>. (Year: 2017).*

"Welcome to IBM z/OS V2R1 documentation (Mar. 2017)". IBM Knowledge Center. z/OS Version 2.1.0. <https://www.ibm.com/support/knowledgecenter/en/SSLTBW_2.1.0/com.ibm.zos.v2r1/en/homepage.html>. (Year: 2017).*

"Generic Volume Data Collection: Example 1". IBM Knowledge Center. z/OS Version 2.1.0. <https://www.ibm.com/support/knowledgecenter/en/SSLTBW_2.1.0/com.ibm.zos.v2r1.idai200/dcxmpl.htm>. (Year: 2014).*

Artis, H., "Data Set Allocation and Performance Management Under System Managed Storage," Performance Associates Inc., Published in Proceedings of CMG '90, 1990, 12 pages, retrieved from https://pdfs.semanticscholar.org/abca/3e5320b1d5e51663091d7c034a61ec0ed268.pdf.

IBM, "What is the storage management subsystem?" IBM Knowledge Center, 2014, 3 pages, retrieved from https://www.ibm.com/support/knowledgecenter/en/SSLTBW_2.1.0/com.ibm.zos.v2r1.arcd000/u3012.htm.

IBM, "Source Control Data Set," IBM Knowledge Center, Accessed on Oct. 24, 2019, 3 pages, retrieved from https://www.ibm.com/support/knowledgecenter/en/SSLTBW_2.2.0/com.ibm.zos.v2r2.idag200/source.htm.

* cited by examiner

USING GENERIC VOLUME ENTRIES TO ADD SPECIFIC VOLUMES MANAGED BY A STORAGE MANAGEMENT SUBSYSTEM (SMS) TO A VOLUME LIST DEFINITION

BACKGROUND

The present invention relates to storage management subsystem (SMS) managed volumes, and more specifically, this invention relates to using generic volume entries to add specific volumes managed by a SMS to a volume list definition.

SMSs are often utilized, at least in part, for enabling a system-managed storage environment, as opposed to strictly a user-managed storage environment. Specifically, SMSs undertake data storage tasks/determination such as, e.g., what locations at which volumes of data are to be stored, when data volumes are stored at such locations, where/when data volumes are moved in the storage environment, allocating storage space for data volumes, determining how many instances of data of a data volume are stored (such as for data backup purposes), determining security parameters of the storage environment, etc.

SUMMARY

A computer-implemented method according to one embodiment includes receiving a request to add a generic volume entry to a generic volume element list, and storing the generic volume entry in the generic volume element list in a SMS configuration in a source control data set (SCDS). The method further includes building a volume list definition of the SMS configuration, using specific volumes of a first source control dataset and/or a first active control dataset, and parsing a unit control block chain for determining additional specific volumes. It is determined, based on the parsing, whether a specific volume found in the parsing was not used in the building of the volume list definition. In response to a determination that the specific volume found in the parsing was not used in the building of the volume list definition, it is determined, for the specific volume found in the parsing, whether at least one predetermined condition is met. The specific volume found in the parsing is added to the volume list definition in response to a determination that the at least one predetermined condition is met. The generic volume entry is pre-associated with one existing storage group. Moreover, the at least one predetermined condition includes a specific volume entry of the specific volume found in the parsing matching a generic volume entry of the generic volume element list.

A computer program product for using generic volume entries to add specific volumes managed by a SMS to a volume list definition according to one embodiment includes a computer readable storage medium having program instructions embodied therewith. The program instructions are readable and/or executable by a controller to cause the controller to perform the foregoing method.

A system according to one embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
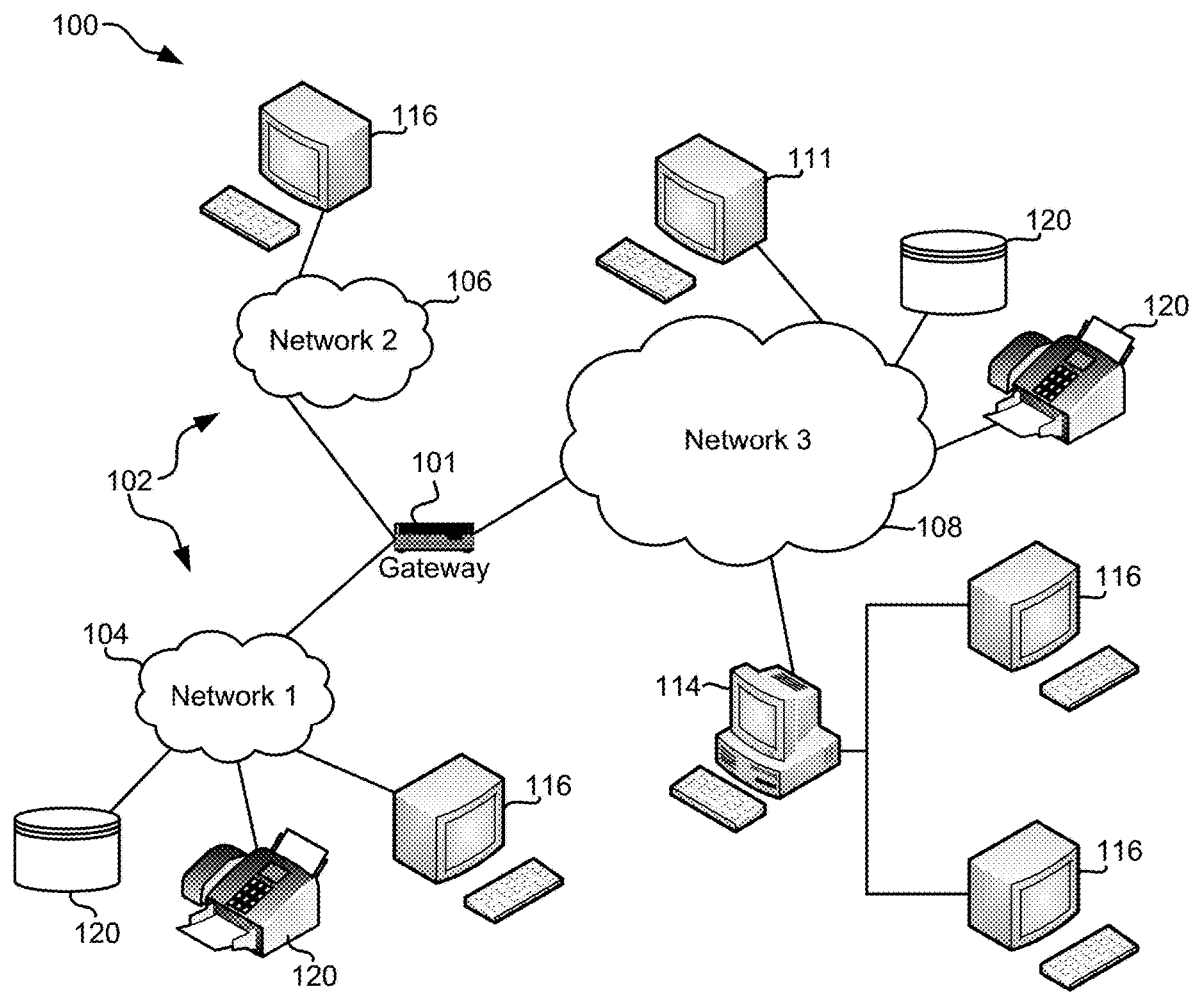
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using generic volume entries to add specific volumes managed by a SMS to a volume list definition.

In one general embodiment, a computer-implemented method includes receiving a request to add a generic volume entry to a generic volume element list, and storing the generic volume entry in the generic volume element list in a SMS configuration in a SCDS. The method further includes building a volume list definition of the SMS configuration, using specific volumes of a first source control dataset and/or a first active control dataset, and parsing a unit control block chain for determining additional specific volumes. It is determined, based on the parsing, whether a specific volume found in the parsing was not used in the building of the volume list definition. In response to a determination that the specific volume found in the parsing was not used in the building of the volume list definition, it is determined, for the specific volume found in the parsing, whether at least one predetermined condition is met. The specific volume found in the parsing is added to the volume list definition in response to a determination that the at least one predetermined condition is met. The generic volume entry is pre-associated with one existing storage group. Moreover, the at least one predetermined condition includes a specific volume entry of the specific volume found in the parsing matching a generic volume entry of the generic volume element list.

In another general embodiment, a computer program product for using generic volume entries to add specific volumes managed by a SMS to a volume list definition includes a computer readable storage medium having program instructions embodied therewith. The program instructions are readable and/or executable by a controller to cause the controller to perform the foregoing method.

In another general embodiment, a system includes a processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
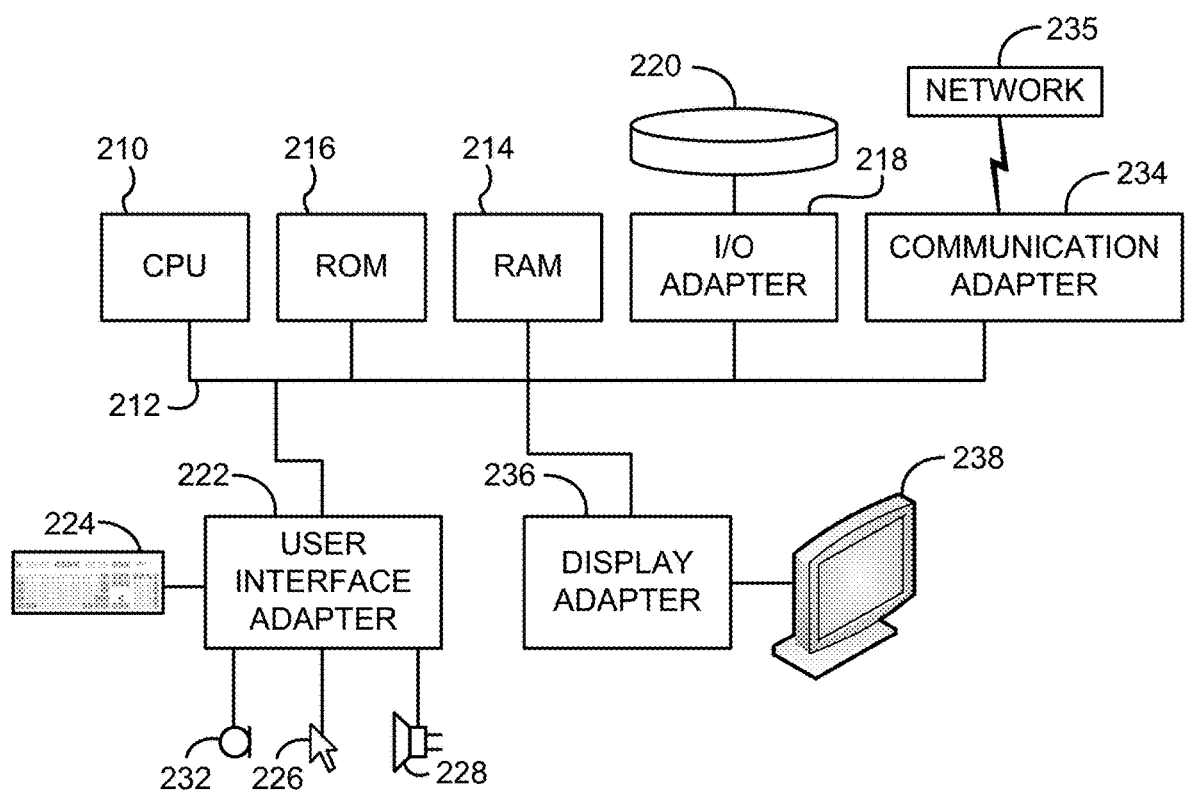
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
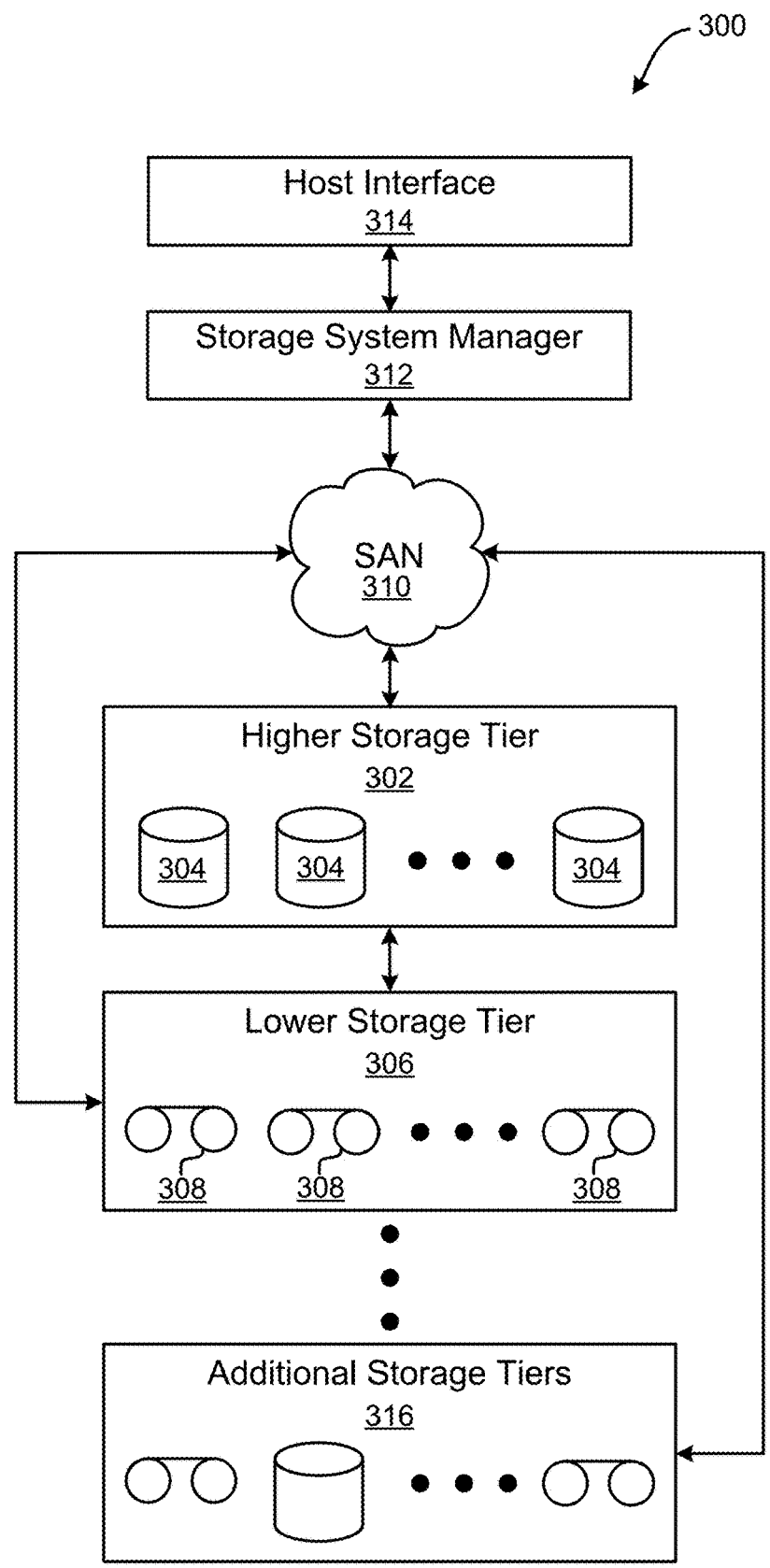
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, SMSs are often utilized, at least in part, for enabling a system-managed storage environment, as opposed to strictly a user-managed storage environment. Specifically, SMSs undertake data storage tasks/determination such as, e.g., what locations at which volumes of data are to be stored, when data volumes are stored at such locations, where/when data volumes are moved in the storage environment, allocating storage space for data volumes, determining how many instances of data of a data volume are stored (such as for data backup purposes), determining security parameters of the storage environment, etc.

In some approaches, to bring a SMS managed volume online, a storage administrator may pre-define a specific volume as offline in a storage group, which may thereafter be brought online to use as an SMS-managed volume, or in an alternative approach, a SCDS may be modified by adding the specific volume to a storage group of SMS policy configuration. For context, a SCDS may contain information detailing an SMS configuration. After modifying the SCDS, the admin may be responsible for validating and activating the SCDS before the specific volume can be used as an SMS-managed volume in an Active Control Data Set (ACDS). However, in such conventional approaches, each specific volume occupies an entry in a volume list definition (VLD). Moreover, there are storage costs associated with expanding the SCDS/ACDS.

In contrast, various embodiments and approaches described herein include using generic volume entries to add specific volumes managed by a SMS to a volume list definition.

Figure 4A:
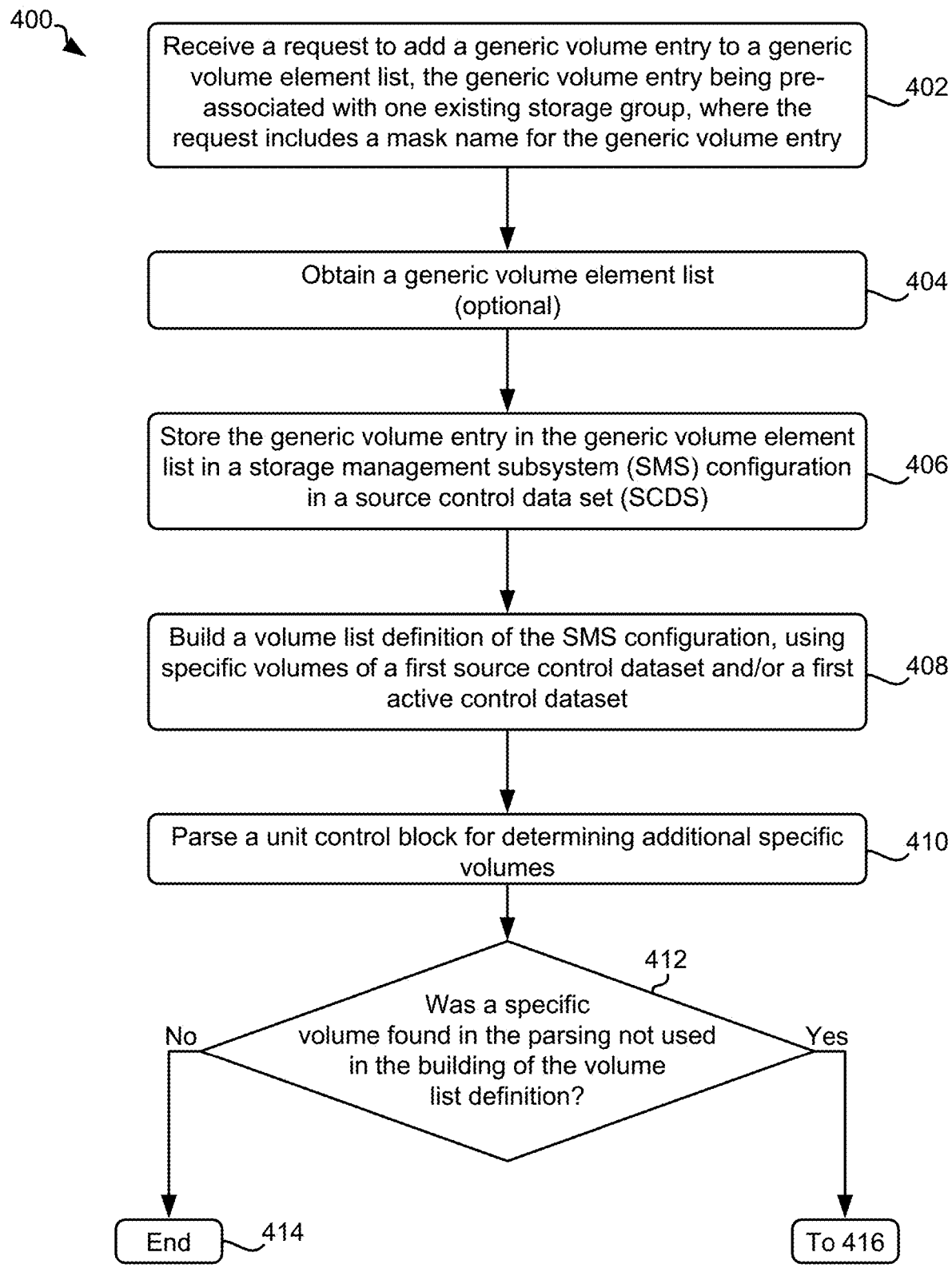
FIG. 4A is a flowchart of a method, in accordance with one embodiment.
Figure 4A:
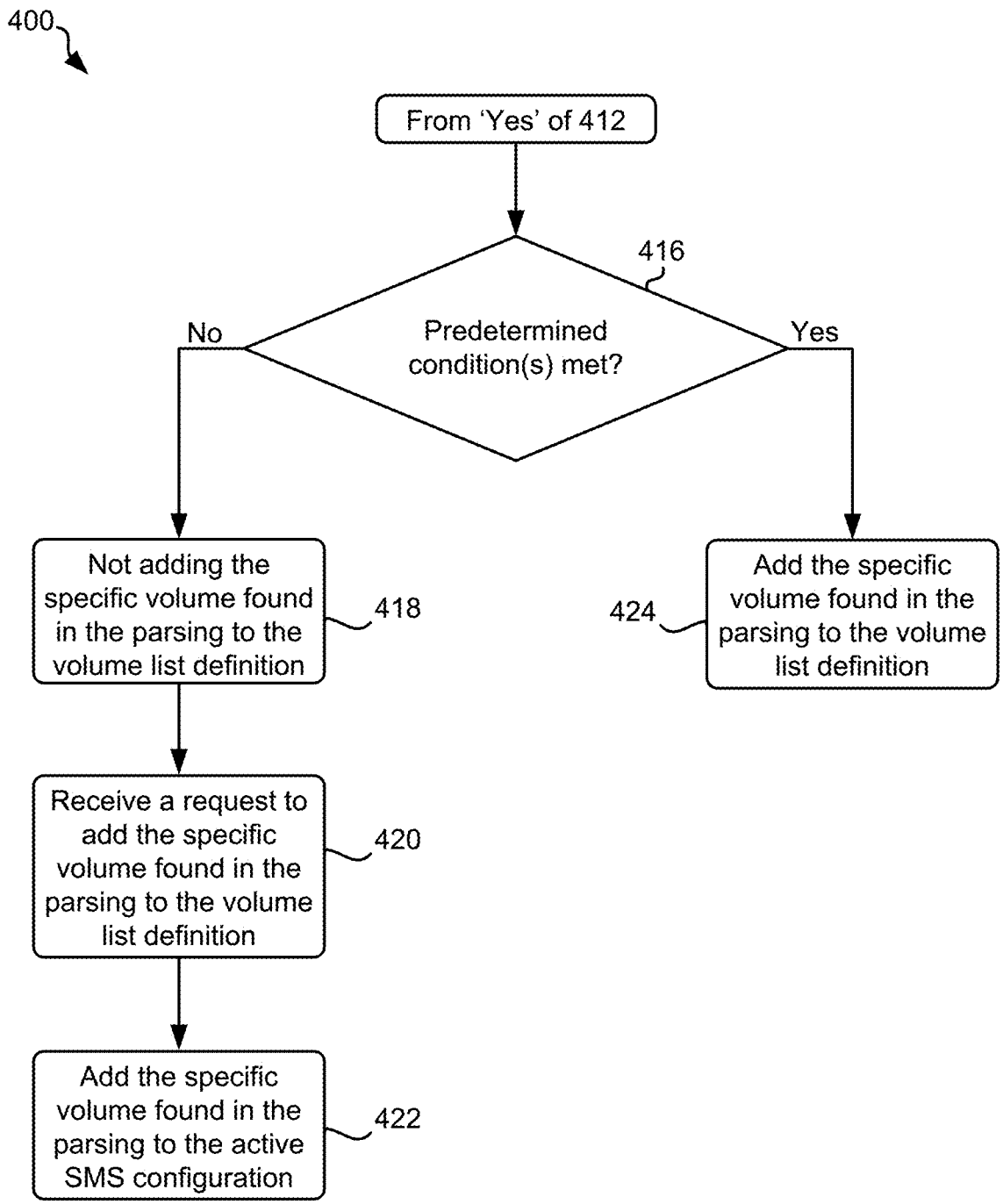

Now referring to FIG. 4A, a flowchart of a method 400 is shown according to one embodiment. The method 400 may be performed in accordance with the present invention in any of the environments depicted in FIGS. 1-3 and 5, among others, in various embodiments. Of course, more or fewer operations than those specifically described in FIG. 4A may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 of method 400 includes receiving a request to add a generic volume entry to a generic volume element list. The request may be received from any source. In one preferred approach, the request is received from an interactive storage management facility (ISMF). For example, in one approach the request may be received from a user as a result of the user entering one or more entries on a user device that displays a generic volume mask field feature that is configured to allow/enable the specification of one or more generic volume entries. In some approaches, an interface of such a user device may include a field for receiving user input that corresponds to a request for, e.g., displaying SMS volume statuses, adding volumes to a volume serial number list, altering volume status(es), deleting volumes from a volume serial number list, etc., e.g., see FIG. 5. In some other approaches, the request may be received from an administrator, e.g., an administrator performing a data management process.

The received request may be a request for a new generic volume entry to be added to a generic volume element list. The generic volume entry may be represented by any predetermined number of characters, e.g., one, five, three hundred, etc., which in some approaches may be included/specified in the request. In one preferred approach the generic volume entry includes no more than six characters. Accordingly, in some approaches, the generic volume entry may be defined by multiple characters. Depending on the approach, any one or more of the characters defining a volume entry may be represented by, e.g., one or more alphanumeric characters, one or more symbols, one or more color patterns, etc.

In some preferred approaches in which the generic volume entry is defined by multiple characters, method 400 may include not allowing a sequential ordering of the characters defining the generic volume entry to be duplicates of a sequential ordering of characters defining a different generic volume entry within the SMS. In other words, because some characters that define the generic volume may in some approaches indicate more than one alphanumeric character, method 400 may in some approaches include preventing two or more generic volume entries from having the same defining characters in the same relative position, i.e., thereby preventing an overlapping of generic volume entries. This is because a volume is not typically shared between storage groups, e.g., in the current approach the generic volume entry may thereby be pre-associated with only a single existing storage group.

As will be further described in examples below, it should be noted that in some approaches, some characters, but not all characters, defining a first generic volume entry may match some characters (in the same respective positions) defining a second generic volume entry. In another approach, method 400 may ensure that no characters defining a first generic volume entry, match characters (in the same respective positions) defining a second generic volume entry.

For purposes of a non-limiting example, a generic volume may be represented by the plurality of characters:

A%%B* Entry 1 where the character "%" indicates any single alphanumeric character in the same relative position is a match, and the character "*" indicates zero or more alphanumeric characters in the same relative position is a match. It should be noted that a generic volume entry having sequential characters "**" is not allowed in the current approach.

For purposes of an illustrative example, with continued reference to the generic volume entry Entry 1, several examples of generic volume entries that are considered duplicates/overlapping include, e.g., AB%B (based on the "*" of the generic volume entry A%%B* indicating zero or more alphanumeric characters), ABCB*, A%3B, etc.

Figure 5:
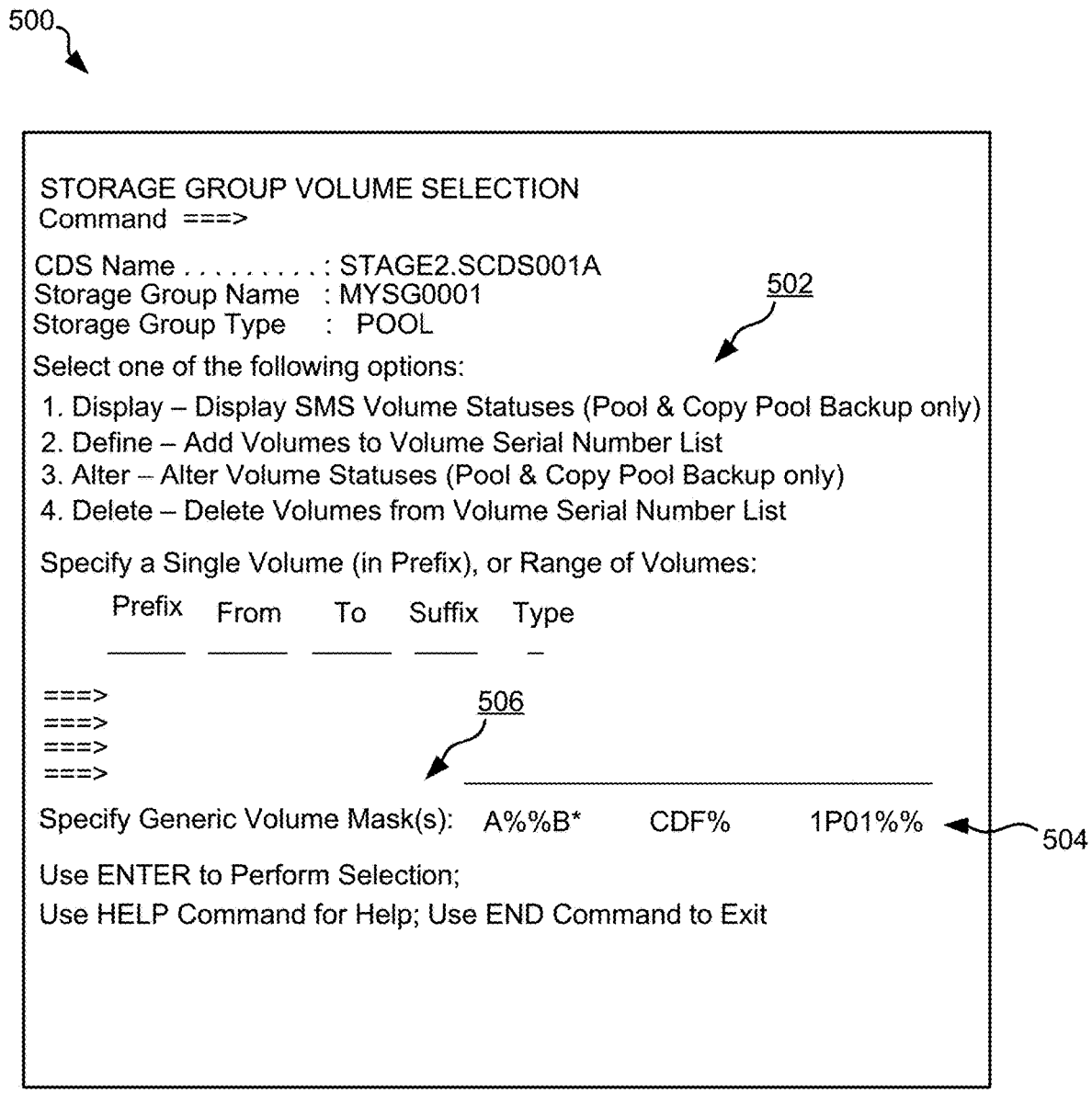
FIG. 5 is an interface, in accordance with one embodiment.

Value(s) of one or more characters defining the generic volume entry may be specified at a predetermined location, e.g., specified as entries input to a generic volume mask field on an ISMF panel, e.g., see FIG. 5.

In some approaches, in response to receiving the request, a generic volume element list may be obtained, e.g., see optional operation 404 of method 400. For contextual purposes, "obtaining" may include any known type of obtaining a list. For example, in one approach, obtaining a generic volume element list may include creating the generic volume element list. In another approach, obtaining a generic volume element list may include retrieving the generic volume element list. In yet another approach, obtaining a generic volume element list may include accessing a generic volume element list indicated in the request. It may be noted that in the present embodiment, operation 404 is noted to be optional because in some approaches, a generic volume element list may already be obtained/available upon receiving the request.

The generic volume entry may in one approach be stored in the generic volume element list in a SMS configuration in a SCDS, e.g., see operation 406 of method 400. The SCDS may contain information of at least the SMS configuration having the generic volume element list in which the generic volume entry is stored. In some approaches, the generic volume element list in the SMS configuration may have one or more other elements stored therein prior to storing the generic volume entry. However, in some preferred approaches, the generic volume entry is stored in a new generic volume element list in the SMS configuration. For example, assuming that the SMS configuration includes twenty-two element lists, the generic volume entry may be stored in the SMS and thereby establish a twenty-third generic volume element list.

A volume list definition of the SMS configuration may be built using specific volumes of a first SCDS and/or a first ACDS, e.g., see operation 408 of method 400. The volume list definition of the SMS configuration may be built using any known technique(s). Moreover, the volume list definition of the SMS configuration may be built for any reason, e.g., at a predetermined time, in response to a determination being made, in response to receiving a request, etc. For example, in one approach, the volume list definition may be built in response to a determination that an address space of the SMS configuration increases. According to another example, the volume list definition may be built in response to a determination that an activation occurs that results in a new active SMS configuration, e.g., an in memory or in virtual storage (in-core) SMS configuration.

Operation 410 of method 400 includes parsing a unit control block chain of a unit control block for determining additional specific volumes. The unit control block may be a control block which holds information about an I/O device in an operating system configuration. In some approaches, at Initial Program Load (IPL) or dynamic configuration, unit control blocks for all I/O devices connected to a currently operating system configuration may be built from/using Hardware Configuration Definition (HCD) device definition information in an Input/Output Definition File (IODF) and Unit Information Module (UIM). The unit control block chain may reside in common storage/memory of an operating system, e.g., such as an operating system of a system on which method 400 is being performed.

As will be described elsewhere below (see decision 412), in the present approach, the unit control block chain may be parsed for determining additional specific volumes, e.g., of the first SCDS and/or the first ACDS, that were not used in the building of the volume list definition. The unit control block chain may be parsed using any known technique(s).

In the current approach, it may be determined, based on the parsing, whether a specific volume (or equivalently more than one specific volume) found in the parsing was not used in the building of the volume list definition, e.g., see decision 412 of method 400. In response to a determination that there are no specific volumes found in the parsing that were not used in the building of the volume list definition (as illustrated by the "No" logical path of decision 412), in the current approach, method 400 may end, e.g., see operation 414. In contrast, in response to a determination that a specific volume found in the parsing (or equivalently more than one specific volume found in the parsing) was not used in the building of the volume list definition (as illustrated by the "Yes" logical path of decision 412), in some approaches, it may be determined whether the specific volume(s) found in the parsing should be added to the volume list definition. In the current approach, such a determination may be made at least in part based on predetermined conditions being met, e.g., see decision 416. However, in other approaches, a determination as to whether specific volume(s) found in the parsing should be added to the volume list definition, may be additionally and/or alternatively be based on any other factor(s).

Decision 416 of method 400 includes determining, for a specific volume found in the parsing, that was determined to not have been used in the building of the volume list definition, whether at least one predetermined condition is met. It should be prefaced that in several of the following examples, several predetermined conditions are considered with respect to a single specific volume found in the parsing. However, such examples are not intended to limit the descriptions herein. Accordingly, depending on the approach, any one or more predetermined conditions may be applied to any one or more specific volumes found in the parsing.

The predetermined condition(s) may include any parameters which may be set and/or adjusted at any time. Looking to FIG. 4B, exemplary sub-processes 430-436 of the process are illustrated in accordance with one embodiment, one or more of which may be used to perform a determination of decision 416 of FIG. 4A. However, it should be noted that the sub-processes of FIG. 4B are illustrated in accordance with one embodiment which is in no way intended to limit the descriptions herein.

In some approaches, each of the specific volumes may be pre-associated with a respective specific volume entry. Moreover, each specific volume entry may be represented by any predetermined number of characters. In one approach the specific volume entry includes no more than six characters. Accordingly, in some approaches, the specific volume entry may be defined by multiple characters, each of which may be a specified single alphanumeric character. In some preferred approaches in which the specific volume entry is defined by multiple characters, method 400 may include not allowing a sequential ordering of the characters defining a specific volume entry to be duplicates of a sequential ordering of characters defining a different specific volume entry. In other words, method 400 may in some approaches include preventing two or more specific volume entries from having the same defining characters in the same relative position, i.e., thereby preventing an overlapping of specific volume entries.

Figure 4B:
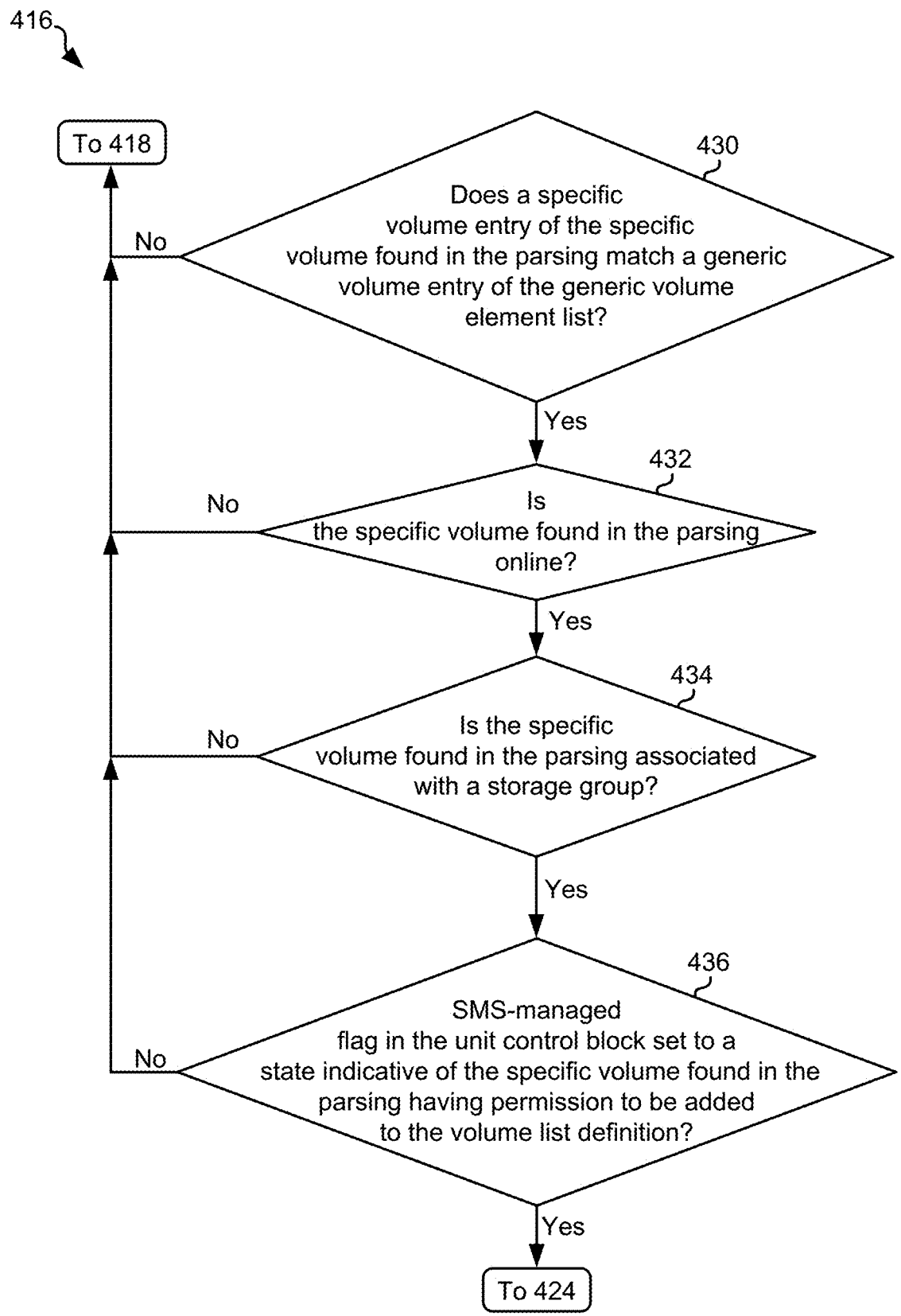
FIG. 4B is a flowchart having sub-operations of an operation of the method of FIG. 4A.

With continued reference to FIG. 4B, in one approach, the at least one predetermined condition includes a specific volume entry of the specific volume found in the parsing matching a generic volume entry of the generic volume element list, e.g., see sub-operation 430. In some approaches, the generic volume entry of the generic volume element list that the specific volume found in the parsing matches may be the generic volume entry received in the request, e.g., see operation 402 of method 400. In some other approaches, the generic volume entry of the generic volume element list that the specific volume matches may be another generic volume entry stored in the generic volume element list.

In some approaches, the specific volume entry of the specific volume may be determined to match a generic volume entry of the generic volume element list in response to a determination that a predetermined number of characters defining the specific volume entry match a predetermined number of characters defining the generic volume entry. For example, in one preferred approach, the specific volume entry of the specific volume may be determined to match a generic volume entry of the generic volume element list in response to a determination that each of the characters of the specific volume entry match a different one of the characters of the generic volume entry (in the same respective position). Note that an alphanumeric character of a specific volume entry may be considered a match of a character of a generic volume entry that indicates any single alphanumeric character, e.g., such as the "%" of Entry 1.

However, in other approaches, the specific volume entry of the specific volume may be determined to match a generic volume entry of the generic volume element list in response to a determination that a portion of the characters of the specific volume entry match a portion of the characters of the generic volume entry.

According to another approach, a predetermined condition may additionally and/or alternatively include the specific volume found in the parsing being online, e.g., see sub-operation 432. In order to determine whether the specific volume found in the parsing is online or not, one or more parameters may be considered, e.g., availability of the specific volume such as for modification, activity within the specific volume, an amount of time that has elapsed since the specific volume has been most previously accessed, a log of the specific volume and/or the SMS, etc.

Whether or not the specific volume found in the parsing is associated with a storage group is an additional and/or alternative predetermined condition that may be considered in some approaches, e.g., see sub-operation 434. A determination as to whether the specific volume is associated with a storage group may at least in part include, e.g., tracing a pointer of the specific volume, parsing logical information that is associated with the specific volume, etc.

In another approach, a predetermined condition may additionally and/or alternatively include an SMS-managed flag in a unit control block, e.g., a unit control block associated with the parsed unit control block chain, being set to a state indicative of the specific volume found in the parsing having permission to be added to the volume list definition, e.g., set to "on" grants the permission and set to "off" revokes/denies the permission. According to various approaches, a determination of a current state of the SMS-managed flag in the unit control block may include, e.g., accessing status information of the specific volume, accessing a log of the specific volume and/or the SMS, accessing credentials granted to the specific volume, etc.

In some approaches, in order for an I/O device to be connect to a current operating system configuration, the device may be designated with an indication of whether the device is SMS-managed or not. For example, in some approaches, such an indication may be set by an administrator that initializes the device and/or may be set in response to receiving an indication from an administrator. For each initialization, the device may be associated with a unit control block. In some approaches, in response to a determination that the indication is SMS-managed, the SMS-managed flag may be set to "on." However, in response to a determination that the indication is not SMS-managed, the SMS-managed flag may be set to "off."

With joint reference now to FIGS. 4A-4B, in some approaches, in response to a determination that any one or more of the predetermined conditions are met (as illustrated by the "YES" logical paths of sub-operations 430, 432, 434, 436), the specific volume found in the parsing may be added to the volume list definition, e.g., see operation 424 of method 400. The number of predetermined condition(s) that are to be met for the specific volume found in the parsing to be added to the volume list definition may depend on the approach. For example, in one approach, method 400 may include considering only one predetermined condition, and therefore an addition of the specific volume found in the parsing to the volume list definition may depend on only the one predetermined condition being met. In another example, method 400 may include considering a plurality of predetermined conditions. In such an approach, the specific volume found in the parsing may be added to the volume list definition in response to determining that a predetermined number of the plurality of predetermined conditions are met, e.g., one, a plurality, all, a majority, etc.

As illustrated by the "No" logical path of sub-operations 430, 432, 434, 436 of FIG. 4B, in some approaches, one or more of the predetermined condition(s) may not be met. In one or more of such approaches, in response to any one or more of the predetermined conditions not being met, the specific volume found in the parsing may not be added to the volume list definition, e.g., see operation 418 of method 400.

As briefly mentioned elsewhere above, in some approaches, the specific volume found in the parsing may be added to an SMS configuration despite a determination that one or more of the predetermined condition(s) are not met. For example, in one illustrative approach, it may be assumed that a predetermined includes the specific volume found in the parsing being online, and moreover it may be assumed that it is determined that the specific volume is offline. Accordingly, in such an approach, the specific volume found in the parsing is not added to the volume list definition in response to the determination that the predetermined condition of the specific volume found in the parsing being online, not being met. However, in some approaches, method 400 may include receiving (before and/or subsequent the determination that the at least one predetermined condition is not met) a request to add the specific volume found in the parsing to the volume list definition, e.g., see operation 420. The request to add the specific volume found in the parsing to the volume list definition may in one approach be received as a "VARY ONLINE" command. Operation 422 of method 400 includes adding the specific volume found in the parsing to the active SMS configuration in response to receiving the request to add the specific volume found in the parsing to the volume list definition. In some approaches the specific volume found in the parsing is only added to the active SMS configuration in response to receiving the request. According to some further approaches, the specific volume found in the parsing may be additionally and/or alternatively added to any one or more other locations, e.g., the generic volume element list, another volume list, another storage location, etc. An illustrative example detailing adding an SMS-managed volume to an active SMS configuration subsequent receiving a request is described below.

For purposes of an example, it may be assumed that a request is received to add a volume associated with the generic volume entry "A%%B*" to a generic volume element list. In the current approach, the request may be received from a user as a result of the user entering the generic volume entry "A%%B*" on a user device that displays a generic volume mask field feature that is configured to allow/enable the specification of one or more generic volume entries. It may furthermore be assumed that the volume associated with the specific volume entry A13B is at least initially not added to a volume list definition, in response to a determination that the volume is offline. Note that in the current example, the volume is at least initially not added to a volume list definition despite the characters of the specific volume entry A13B matching the characters of the generic volume entry "A%%B*" (recall as described elsewhere above that the character "%" may indicate any single alphanumeric character in the same relative position is a match, and the character "*" indicates zero or more alphanumeric characters in the same relative position is a match). In response to receiving a request, e.g., a command including "VARY ucb_device, ONLINE", to add the volume associated with the specific volume entry A13B to the volume list definition, the volume associated with the specific volume entry A13B may be added only into an active SMS configuration, e.g., an in-core SMS configuration.

With continued reference to the above example, in some approaches, the volume associated with the specific volume entry A13B is not saved in an ACDS. Instead, the volume associated with the specific volume entry A13B may be stored in a different dataset, e.g., a SMS Communications Data Set (COMMDS). In one approach, the volume associated with the specific volume entry A13B may be stored in the COMMDS, at least until one or more other systems pick-up an update of the active SMS configuration. For example, one or more of the other systems may be of SMSplex® by IBM® (which may be purchased from IBM North America, 590 Madison Avenue, New York, N.Y. 10022, United States).

In some approaches, in response to a new SCDS/ACDS being activated, and a determination that the new SCDS/ACDS does not contain any generic volume entries, the VLD of the active in-core SMS configuration may be built with the specific volumes from the new SCDS/ACDS. Otherwise, in some approaches, the VLD may be built as it may be in response to the SMS address space increasing. For example, all volume information may be merged from an old VLD of the old active in-core SMS configuration to the new VLD of the new active in-core SMS configuration.

It should be noted that subsequent performing one or more of the operations described elsewhere above, e.g., see method 400, in response to receiving a request/command for listing volumes, e.g., a LISTVOL command of ISMF against a storage group, in some approaches, only the specific volumes of the storage group may be listed. Similarly, in response to receiving a request/command for a volume list, e.g., a GETLIST request for the SMS to obtain a volume element list for a storage group, in some approaches, only the specific volumes of the storage group may be obtained. However, a new panel may be generated and output for displaying the new list of generic volume entries. Moreover, as a result of implementing of one or more of the embodiments and/or approaches described herein in an SMS environment, admins/users eventually become no longer responsible for defining specific volumes in a SCDS/ACDS. This is because, as described elsewhere herein, logical placement of one or more specific volumes may be controlled based on predetermined conditions, rather than by a user having to manually specify such specific volume entries. Accordingly, SMS managed volumes may be brought online without admins/users having to modify and activate an updated SMS configuration in a SCDS. These benefits in turn enable a relatively smaller source configuration that is easily maintained, e.g., using minimal user input (if any).

FIG. 5 depicts an interface 500, in accordance with one embodiment. As an option, the present interface 500 may be implemented in conjunction with features from any other embodiment listed herein, such as those described with reference to the other FIGS. Of course, however, such interface 500 and others presented herein may be used in various applications and/or in permutations which may or may not be specifically described in the illustrative embodiments listed herein. Further, the interface 500 presented herein may be used in any desired environment.

In the current approach, the interface 500 includes a plurality of options 502, which may be selected by a user for influencing, e.g., displaying, defining, altering, deleting, etc., volumes in a predetermined data storage environment. For example, a second of the options 502 may be selected, thereby enabling the addition of volumes to a volume serial number list.

The interface 500 additionally includes a generic volume mask field feature 506 that is configured to allow/enable specification of one or more generic volume entries 504, e.g., see generic volume entries: A%%B*, CDF%, and 1P01%%. In one approach, the specification of such generic volume entries may be considered a request, e.g., such as the request received in operation 402 of method 400.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a request to add a generic volume entry to a generic volume element list, the generic volume entry being pre-associated with one existing storage group;
storing the generic volume entry in the generic volume element list in a storage management subsystem (SMS) configuration in a source control data set (SCDS);
building a volume list definition of the SMS configuration, using specific volumes of a first source control dataset and/or a first active control dataset;
parsing a unit control block chain for determining additional specific volumes;
determining, based on the parsing, whether a specific volume found in the parsing was not used in the building of the volume list definition;
in response to a determination that the specific volume found in the parsing was not used in the building of the volume list definition, determining, for the specific volume found in the parsing, whether at least one predetermined condition is met, wherein the at least one predetermined condition includes a specific volume entry of the specific volume found in the parsing matching a generic volume entry of the generic volume element list; and
adding the specific volume found in the parsing to the volume list definition in response to a determination that the at least one predetermined condition is met.

2. The computer-implemented method of claim 1, wherein another one of the at least one predetermined condition includes the specific volume found in the parsing being online.

3. The computer-implemented method of claim 1, wherein another one of the at least one predetermined condition includes an SMS-managed flag in the unit control block being set to a state indicative of the specific volume found in the parsing having permission to be added to the volume list definition.

4. The computer-implemented method of claim 1, wherein the generic volume entry is defined by a predetermined number of characters.

5. The computer-implemented method of claim 4, wherein the generic volume entry is defined by multiple characters, wherein a sequential ordering of the characters defining the generic volume entry are not duplicates of a sequential ordering of characters defining a different generic volume entry.

6. The computer-implemented method of claim 1, wherein the volume list definition is built in response to a determination that an address space of the SMS configuration increases.

7. The computer-implemented method of claim 1, wherein the volume list definition is built in response to a determination that an activation occurs that results in a new active SMS configuration.

8. The computer-implemented method of claim 7,
wherein another one of the at least one predetermined condition includes the specific volume found in the parsing being online, and comprising:
not adding the specific volume found in the parsing to the volume list definition in response to a determination that the predetermined condition including the specific volume found in the parsing being online is not met;
receiving a request to add the specific volume found in the parsing to the volume list definition, wherein the request is received subsequent the determination that the predetermined condition including the specific volume found in the parsing being online is not met; and
adding the specific volume found in the parsing to the active SMS configuration in response to receiving the request to add the specific volume found in the parsing to the volume list definition.

9. A computer program product for using generic volume entries to add specific volumes managed by a storage management subsystem (SMS) to a volume list definition, the computer program product comprising a computer readable storage medium having program instructions embodied therewith, the program instructions readable and/or executable by a controller to cause the controller to:
receive, by the controller, a request to add a generic volume entry to a generic volume element list, the generic volume entry being pre-associated with one existing storage group;
store, by the controller, the generic volume entry in the generic volume element list in a storage management subsystem (SMS) configuration in a source control data set (SCDS);

build, by the controller, a volume list definition of the SMS configuration, using specific volumes of a first source control dataset and/or a first active control dataset;

parse, by the controller, a unit control block chain for determining additional specific volumes;

determine, by the controller, based on the parsing, whether a specific volume found in the parsing was not used in the building of the volume list definition;

in response to a determination that the specific volume found in the parsing was not used in the building of the volume list definition, determine, by the controller, for the specific volume found in the parsing, whether at least one predetermined condition is met, wherein the at least one predetermined condition includes a specific volume entry of the specific volume found in the parsing matching a generic volume entry of the generic volume element list; and add, by the controller, the specific volume found in the parsing to the volume list definition in response to a determination that the at least one predetermined condition is met.

10. The computer program product of claim 9, wherein another one of the at least one predetermined condition includes the specific volume found in the parsing being online.

11. The computer program product of claim 9, wherein another one of the at least one predetermined condition includes an SMS-managed flag in the unit control block being set to a state indicative of the specific volume found in the parsing having permission to be added to the volume list definition.

12. The computer program product of claim 9, wherein the generic volume entry is defined by a predetermined number of characters.

13. The computer program product of claim 12, wherein the generic volume entry is defined by multiple characters, wherein a sequential ordering of the characters defining the generic volume entry are not duplicates of a sequential ordering of characters defining a different generic volume entry.

14. The computer program product of claim 9, wherein the volume list definition is built in response to a determination that an address space of the SMS configuration increases.

15. The computer program product of claim 9, wherein the volume list definition is built in response to a determination that an activation occurs that results in a new active SMS configuration.

16. The computer program product of claim 15, wherein another one of the at least one predetermined condition includes the specific volume found in the parsing being online, wherein the program instructions are readable and/or executable by the controller to cause the controller to:

not add, by the controller, the specific volume found in the parsing to the volume list definition in response to a determination that the predetermined condition including the specific volume found in the parsing being online is not met;

receive, by the controller, a request to add the specific volume found in the parsing to the volume list definition, wherein the request is received subsequent the determination that the predetermined condition including the specific volume found in the parsing being online is not met; and add, by the controller, the specific volume found in the parsing to the active SMS configuration in response to receiving the request to add the specific volume found in the parsing to the volume list definition.

17. A system, comprising:

a processor; and logic integrated with the processor, executable by the processor, or integrated with and executable by the processor, the logic being configured to:

receive a request to add a generic volume entry to a generic volume element list, the generic volume entry being pre-associated with one existing storage group;

store the generic volume entry in the generic volume element list in a storage management subsystem (SMS) configuration in a source control data set (SCDS);

build a volume list definition of the SMS configuration, using specific volumes of a first source control dataset and/or a first active control dataset;

parse a unit control block chain for determining additional specific volumes;

determine, based on the parsing, whether a specific volume found in the parsing was not used in the building of the volume list definition;

in response to a determination that the specific volume found in the parsing was not used in the building of the volume list definition, determine, for the specific volume found in the parsing, whether at least one predetermined condition is met, wherein the at least one predetermined condition includes a specific volume entry of the specific volume found in the parsing matching a generic volume entry of the generic volume element list; and add the specific volume found in the parsing to the volume list definition in response to a determination that the at least one predetermined condition is met.

18. The system of claim 17, wherein another one of the at least one predetermined condition includes the specific volume found in the parsing being online.

19. The system of claim 17, wherein another one of the at least one predetermined condition includes an SMS-managed flag in the unit control block being set to a state indicative of the specific volume found in the parsing having permission to be added to the volume list definition.

20. The system of claim 17, wherein the generic volume entry is defined by a predetermined number of characters.

* * * * *